(12) United States Patent
Guichard

(10) Patent No.: US 9,032,210 B2
(45) Date of Patent: May 12, 2015

(54) MOBILE ELECTRONIC DEVICE CONFIGURED TO ESTABLISH SECURE WIRELESS COMMUNICATION

(75) Inventor: Olivier Guichard, Marseilles (FR)

(73) Assignee: Gemalto SA, Meudon (FR)

( * ) Notice: Subject to any disclaimer, the term of this patent is extended or adjusted under 35 U.S.C. 154(b) by 155 days.

(21) Appl. No.: 13/391,714

(22) PCT Filed: Aug. 11, 2010

(86) PCT No.: PCT/EP2010/061704
§ 371 (c)(1),
(2), (4) Date: Feb. 22, 2012

(87) PCT Pub. No.: WO2011/023554
PCT Pub. Date: Mar. 3, 2011

(65) Prior Publication Data
US 2012/0151519 A1    Jun. 14, 2012

(30) Foreign Application Priority Data
Aug. 26, 2009    (EP) ..................................... 09305789

(51) Int. Cl.
*H04N 21/2347*    (2011.01)
*H04L 12/28*    (2006.01)
*H04L 9/00*    (2006.01)
*H04L 29/06*    (2006.01)
*H04W 12/06*    (2009.01)
(52) U.S. Cl.
CPC ........... *H04L 63/0853* (2013.01); *H04W 12/06* (2013.01)

(58) Field of Classification Search
USPC ............ 713/168, 172, 155, 170, 194; 725/31; 455/411, 558; 726/9, 3, 26; 380/255, 380/270
See application file for complete search history.

(56) References Cited

U.S. PATENT DOCUMENTS

| | | | |
|---|---|---|---|
| 7,275,157 B2 * | 9/2007 | Cam Winget ................. | 713/168 |
| 8,015,417 B2 * | 9/2011 | Kato et al. .................... | 713/193 |
| 8,250,662 B1 * | 8/2012 | Zhu ................................ | 726/26 |
| 8,359,070 B1 * | 1/2013 | Zhu .............................. | 455/558 |
| 2005/0076212 A1 * | 4/2005 | Mishina et al. ............... | 713/168 |
| 2006/0142029 A1 * | 6/2006 | Shao et al. .................... | 455/466 |
| 2007/0043947 A1 * | 2/2007 | Mizikovsky et al. ......... | 713/172 |
| 2007/0073937 A1 * | 3/2007 | Feinberg et al. ................ | 710/62 |

(Continued)

OTHER PUBLICATIONS

An English translation of the corrected version of the International Preliminary Report on Patentability (Form PCT/IB/373) and the Written Opinion of the International Searching Authority (Form PCT/ISA/237) dated Apr. 17, 2012, issued in corresponding International Application No. PCT/EP2010/061704. (6 pages).

(Continued)

*Primary Examiner* — Shewaye Gelagay
*Assistant Examiner* — Shanto M Abedin
(74) *Attorney, Agent, or Firm* — Buchanan Ingersoll & Rooney PC

(57) ABSTRACT

The invention relates to a method for configuring a mobile device capable of reproducing, for a user, multimedia content previously provided by a remote content server. The invention relates to using a client installed on said electronic device to relay authentication requests between a card, preferably complying with the provisions of the Mobile Commerce Extension standard, and an authentication server that is accessible via an access point.

12 Claims, 1 Drawing Sheet

(56) References Cited

U.S. PATENT DOCUMENTS

Figure 1:
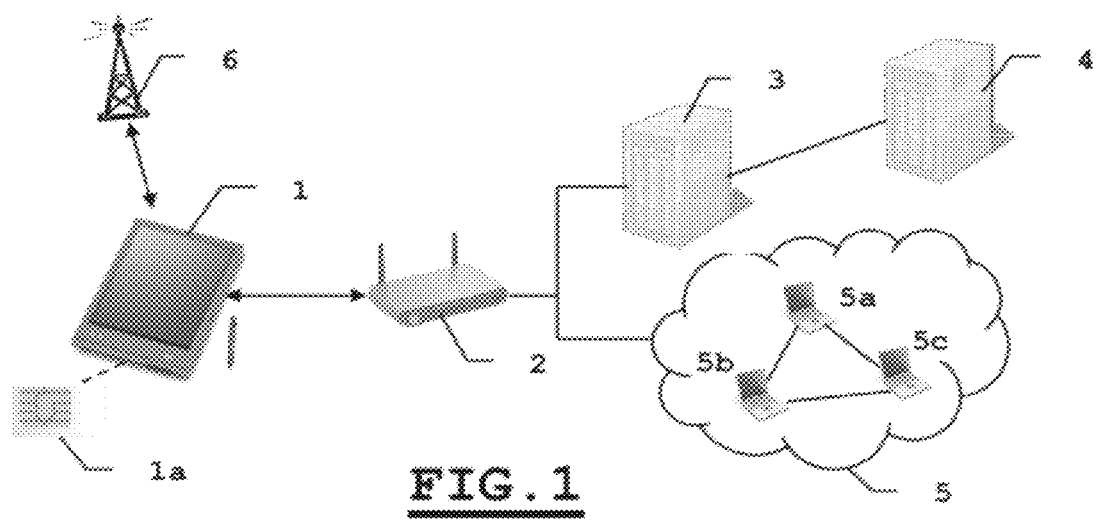

| | | | | |
|---|---|---|---|---|
| 2008/0263649 | A1* | 10/2008 | Smadja et al. | 726/9 |
| 2009/0088133 | A1* | 4/2009 | Orlassino | 455/411 |
| 2010/0115200 | A1* | 5/2010 | Papagrigoriou | 711/115 |
| 2010/0190522 | A1* | 7/2010 | Orlassino | 455/552.1 |
| 2011/0028125 | A1* | 2/2011 | Dehlinger et al. | 455/411 |
| 2011/0113248 | A1* | 5/2011 | Kocher | 713/168 |
| 2011/0265156 | A1* | 10/2011 | Bombay | 726/5 |

OTHER PUBLICATIONS

International Search Report (PCT/ISA/210) issued on Dec. 2, 2010, by European Patent Office as the International Searching Authority for International Application No. PCT/EP2010/061704.

Written Opinion (PCT/ISA/237) issued on Dec. 2, 2010, by European Patent Office as the International Searching Authority for International Application No. PCT/EP2010/061704.

* cited by examiner

MOBILE ELECTRONIC DEVICE CONFIGURED TO ESTABLISH SECURE WIRELESS COMMUNICATION

The invention relates to electronic devices communicating with the outside world, mainly using contactless communication protocols. More precisely, the invention relates to portable video players, multimedia internet tablets, or more generally any mobile electronic device having access to multimedia content provided by a remote content server.

New economical models are being developed, such as, for example, the so-called "pay per view" model. With this model, a client can download and/or play a multimedia content against payment. In order to prevent any unauthorized access to said content, viewing and/or loading a multimedia content thus requires the communication between the viewing device and a content server to be protected, or the content to be directly protected. This content thus becomes a protected multimedia content.

In order to satisfy this protection requirement, some mobile devices have integrated means for implementing a secure communication protocol as a one-way or mutual authentication toward the content servers.

As an alternative solution, contents are beforehand enciphered and loading and/or viewing these require(s) deciphering. Playing a protected content means the sound and/or images rendering of said content, as well as a possible deciphering function which can be executed "on the fly". Such deciphering function can be a prerequisite to said rendering within the scope of content delivered as a video stream, for instance. The means integrated in the mobile devices which provide such functions thus provide the deciphering, during the storage of content delivered enciphered, or a deciphering "on the fly" of content delivered as an enciphered video stream, for instance. Implementing such processing generally relies on handling secrets which can take the form of cryptographic keys. Such keys are preferably obtained from a third party, for instance a content provider, within the scope of a contractual commitment signed between a client and said provider. Such contractual commitment can, for example, result from the purchase or the taking out of a subscription by a client with a content provider.

Managing, loading or cancelling said secrets are complex operations. They further require the integrated means to resist the main known attacks, with a view to making it impossible for unauthorized or even malevolent persons, to obtain information pertaining to the secrets and to make a fraudulent use or trade thereof.

To meet this requirement, a first solution consists in providing a mobile device with so-called TRM ("Tamper Resistant Means") integrated means, which means they resist the known attacks. Such means most often take the form of a chip card inserted into a mobile device, or a microcontroller used in the field of chip cards, directly inserted into the mobile device.

Thus, mobile telephones can be found which give access to protected multimedia contents. Authentication or even deciphering functions are provided by a subscriber identification (SIM: Subscriber Identity Module), or (USIM: Universal Subscriber Identity Module) card existing in said mobile telephone.

For instance, EAP-SIM or EAP-AKA (Extensible Application Protocol) architectures and protocols currently give access to protected contents. Under the aegis of an agreement between a mobile telephone operating company and a protected content provider, the management of secrets owned by said provider can conventionally be implemented using secure protocols of the OTA (Over The Air) type, known to the operators.

As an alternative, mobile devices can be found which do not provide any mobile telephone function but host resisting inner means, which store and handle the required secrets. In this case, the management of the development, distribution and cancellation of secrets is the content providers' responsibility. Providers are often obliged to sign agreements with mobile device manufacturers so that said manufacturers can initialize secrets before marketing such mobile devices. Thus, a mobile device must, for instance, be customized by a manufacturer for each client having taken out a subscription with a content provider. Such management can also be quickly penalizing, or even restricting, and affect the development of the sales of such mobile devices as well as the development of the offer by protected contents providers.

In order to be able to operate more freely a protected content requiring deciphering upon downloading, a second solution may first consist in using a first device such as described above, for instance a personal computer coupled with a chip card or a mobile telephone. The latter makes it possible to carry out downloading operations from a protected content and deciphering server. According to the second solution, the protected, thus deciphered and loaded, content can be transferred from the first device to a second mobile device having rendering capacities which are particularly adapted to the user thereof or to said content. However, most of the second devices are not provided with inner means resisting known attacks, means giving access or providing loading or viewing of protected contents. The second solution can also have another advantage for a user but it is tedious for the latter and more particularly not secure for a content provider. As a matter of fact, the distribution of the thus deciphered content to the largest number by a malevolent client becomes easy.

A third solution consists in loading the secrets required for accessing or viewing protected content from a content provider to a mobile device, such as a personal computer, not having the mobile telephone function nor any inner resisting means for taking advantage of said secrets. The security level involved in the third solution is very low and the risk is high for a content provider to establish that secrets have been disclosed or transmitted by a dishonest client or even pirated by a malevolent third party.

The invention aims at solving the above mentioned drawbacks so as to offer a robust, efficient and economical solution making it possible to configure, even after the marketing thereof, a mobile device not necessarily provided with a mobile telephone function, so that the device can provide access to, loading or viewing of protected multimedia contents, while preserving the confidentiality of secrets required for said access, loading and/or viewing. The invention more particularly enables a manufacturer to produce such mobile devices identically and eliminates the necessity of signing a commercial agreement with one or several content provider(s) in order to customize each device.

For this purpose, the invention provides a mobile device capable of reproducing, for a user, multimedia content previously provided by a remote content server including:

means for receiving and managing a mass memory card including inner means resisting to known attacks to make cryptographic calculations;

means for communicating with an access point to a wireless communication network.

Said device further includes a client to relay authentication requests between the card and an authentication server that is accessible via the access point.

The invention further provides a method for configuring such a mobile device including a step of loading into a memory of said device a client to relay authentication requests between a mass memory card including inner means resisting to known attacks to make cryptographic calculations and an authentication server that is accessible via the access point.

According to a first embodiment, the loading step can be automatically carried out upon insertion of the card by the mobile device, the client being unloaded from a mass memory of the card.

As an alternative solution, the loading step can be carried out by the user of the device after inserting the card into said mobile device, using a man-machine interface provided by the device. The client can thus be unloaded from a mass memory of the card.

The invention provides that the method can further include a previous step of loading into the memory of the device means for communicating with said inner means resisting to known attacks of said card if said communication means are not present in the mobile device.

According to this alternative embodiment of the invention, the previous loading step can be automatically carried out by the mobile device upon insertion of the card or by a user of the mobile device using a man-machine interface of the device, with the communicating means being unloaded from a mass memory of the card.

The invention also provides for the utilisation of a mass memory card including inner means resisting known attacks to make cryptographic calculations, storage means, means for controlling the access to said storage means and to the resisting inner means. Said storage means include a client, provided to be unloaded from the storage means into a memory of the mobile device to relay authentication requests between the card and an authentication server that is accessible via an access point. The resisting inner means store and/or generate secrets and/or implement cryptographic calculations required for completing the authentication requests relayed by said client after the installation thereof within the mobile device.

Preferentially, the invention provides that the mass memory card complies with the provisions of the "Mobile Commerce Extension" standard established by the "SD Card Association" organization.

Figure 2:
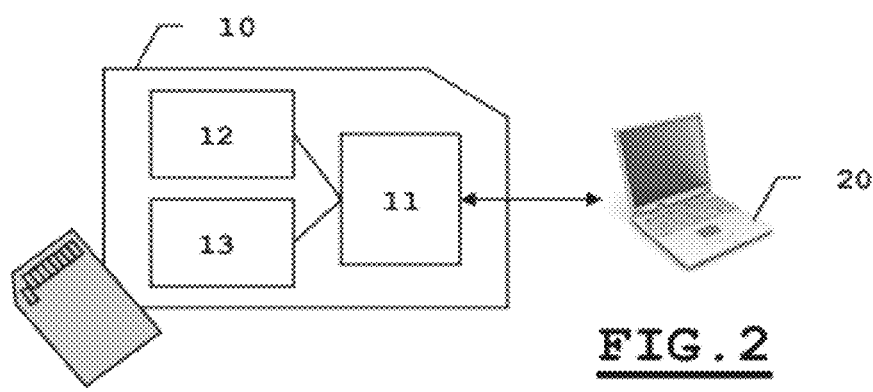
Figure 3:
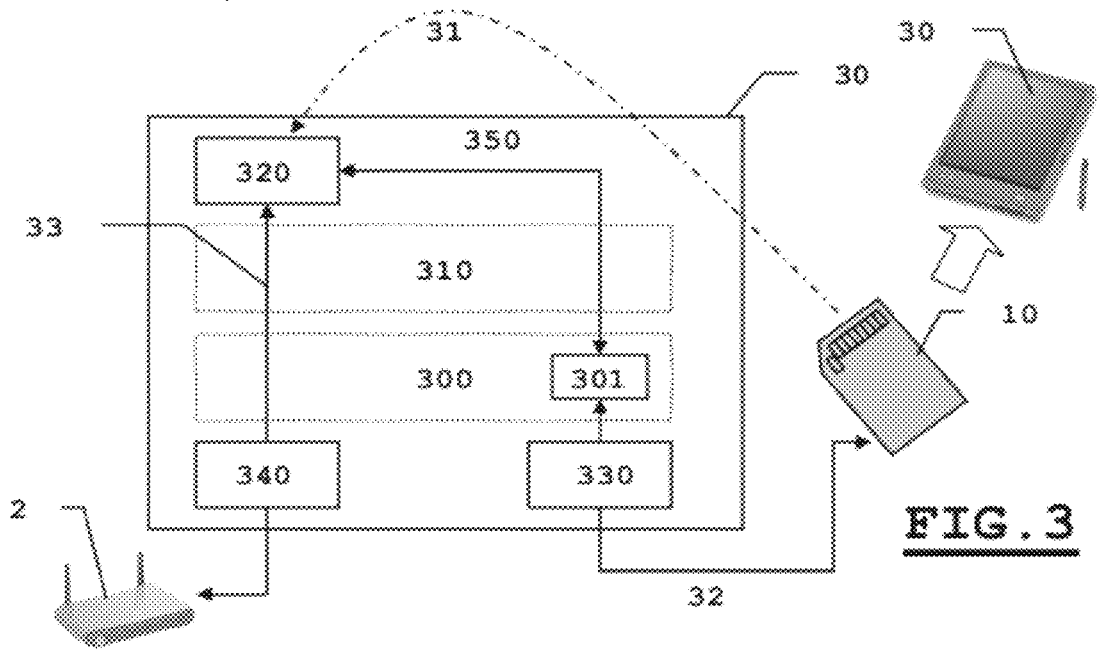

Other characteristics and advantages will appear more clearly when reading the following description and referring to the appended drawings, wherein:

FIG. 1 shows an architecture giving access to protected content from a mobile device of the multimedia internet tablet type including resisting inner means;

FIG. 2 describes an electronic device complying with the provisions of the "Mobile Commerce Extension" standard;

FIG. 3 shows an embodiment according to the invention.

In reference to FIG. 1, a mobile device 1 of the multimedia internet tablet type is capable of establishing a communication with a remote multimedia content server 6. The device 1 enables to view content delivered as, for instance, a video stream. The device contains inner means 1a resisting known attacks, symbolized, in FIG. 1, as a chip card of the SIM (Subscriber Identity Module) or USIM (Universal Subscriber Identity Module) types which are currently found in a mobile telephone. The means 1a could be a non extractible electronic component as well, and be directly connected to the electronic components of the device 1. The means 1a make enciphering and/or deciphering calculations using secrets drifted from, or shared with a content provider and the device 1. Prior to any exchange of secret, it is known to implement a high authentication protocol for instance of the EAP-SIM or EPA-AKA or even of the EAP-TLS types. EAP refers to the English Extensible Application Protocol expression. Such protocol type makes it possible to establish a secure communication using a wireless network as defined, for instance in the IEEE (Institute of Electrical and Electronics Engineers) 802.11 standard, also known as Wi-Fi.

Such type of communication requires authenticating users and filtering the frames they exchange. The exchanged traffic between a visitor also called a "Supplicant" and the communication network, to which access is requested, is thus monitored. In connection with FIG. 1, the "Supplicant" is the mobile device 1, including a wireless network interface. An access point 2, also called the "Authenticator", filters the frames and hosts a client, also called a "Proxy" between the device 1 and an authentication server 3. The latter currently called "RADIUS" in an EAP architecture, provides the interface with a subscribers' data basis 4 for managing the users' accounts and more precisely the rights dedicated to the latter. Within an EAP-SIM or EAP-AKA protocol, the data base 4 is a central data base called HLR (Host Location Register), which stores, for each user identified with an IMSI (International Mobile Subscriber identity) subscriber number, his/her rights defined by the taken subscription and a Ki key. The HLR basis acts as an authentication server producing triplets (RAND, SRES, Kc). RAND is a random number, SRES is a cryptogram and Kc is an enciphering key. SRES and Kc are obtained using a secret key algorithm using the subscriber's Ki key and RAND. SRES is used for authenticating the subscriber. Kc is used for enciphering the data and the voice between a mobile telephone and the network. A subscriber is authenticated by an entity of the visited network, also called MSC (Mobile Switching Center), which stores triplets (RAND, STES, Kc) delivered upon request by the HLR data base in a local data base also called VLR (Visiting Location Register).

The access point 2 further makes it possible for the mobile device 1 to have access to the Internet network 5 or more precisely other remote communicating devices 5a, 5b, 5c.

FIG. 2 shows a new generation of mass memory cards, currently called "McEx-enabled SD Card". This type of card is somehow an extension of a conventional SD (Secure Digital) card. The latter is a removable memory card storing digital data which can be inserted into almost all electronic devices such as cameras, personal or portable computers, or even a walkman or a mobile telephone, using a reduced form factor compatible with the so-called Micro-SD standard. A "McX-enabled SD card" complies with the provisions of the "Mobile Commerce Extension" standard established by the "SD Card Association" organization. Such a card 10 includes means for controlling access 11 and a storage memory 12, as any SD or micro-SD card. It further includes means 13 resisting known attacks similar to those used in the field of chip cards. The means 13 host data belonging to a subscriber and secrets. They further make cryptographic calculations. In order to use the means 13, a communication protocol which can be compared to the one implemented by a chip card, is used through the control means 11. Thus controls, generally of the APDU (Application Protocol Data Unit) type are transmitted from the outside world. As an example, and according to FIG. 2, such controls are transmitted through a computer 20 to a card 10 inserted into said computer 20. Such a card 10 is mainly used within the scope of mobile television applications. Thus, it is possible to insert a card 10 into a mobile device 20 such as a multimedia internet tablet, a video player or a portable computer. The card 10 then generates one or several deciphering key(s) transmitted to the mobile device 20 to enable the deciphering of a video stream, for instance. The card 10 is also used for storing multimedia contents, photographs, music, documents . . . . To operate the means 13 of a card 10, a mobile device must use specific software means also called "drivers" which are generally present in the operation system of said device. If not so, the mass memory 12 can be the only one to be operated by the device 20 through the control means 11.

Most mobile devices currently existing on the market have no mobile telephone function, nor inner means resisting known attacks, to implement cryptographic calculations such as the generation of secrets, enciphering/deciphering of data etc. They generally have, however, means for coupling with other electronic devices. Thus such a mobile device can have connection means to receive a memory card as a SD or micro-SD card.

FIG. 3 makes it possible to illustrate a block diagram of a mobile device 20 such as a multimedia internet tablet according to the invention. The latter includes means 330 for transmitting requests for reading and/or writing to control means 11 of a mass memory card such as described in relation with FIG. 2. According to the models of mobile devices, some may further include software means 301 in order to transmit through the means 330 requests for reading and/or writing and/or executing controls to cards such as described in FIG. 2, with the latter having resisting inner means as used in the field of chip cards. Thus requests transmitted to the card though means 301 and 330 are developed in a format complying with the so-called APDU (Application Protocol Data Unit) controls specific to the chip cards. The mobile device such as described in FIG. 3 may further communicate with the outside world, more particularly Internet, according to a wireless communication protocol, such as Wi-Fi or using a physical connection to a wire network. Hardware 340 and/or software means are integrated in said device 30 for implementing the communication.

In addition, a mobile device 30 such as disclosed while referring to FIG. 3 also includes an operation system 300, or even function libraries 310 to implement the means 301, 330, 340 and others and thus reproduce for a user a multimedia content, using a graphic interface (not shown).

According to an alternative mobile device, the operation system 300 can be called "open" and be enriched by the addition of new functions. Thus, it can be considered for the means 301 required for managing a card according to FIG. 2 to be manually or automatically loaded into the mobile device, after the marketing thereof. The presence of an operation system 300 including such means 301 is needed for implementing the invention.

As a matter of fact, the invention provides to configure a mobile device not having resisting inner means, without requiring however a physical and hardware matching of the device to equip it with a security module or component as used in the chip cards. In fact, the thus matched mobile devices exist and show major drawbacks since each device must be customized using, in particular, a subscriber's identifier, own secrets or secrets dedicated to such or such content provider, etc. The invention provides, on the contrary, to use a card 10 designed for being easily and currently accessed to from a mobile device, with said card including resisting inner means 13 such as those disclosed while referring to FIG. 2. Upon subscribing with a content provider, a card 10 is customized and handed over to a user according to a known and controlled customization mode often met in the field of chip cards such as the SIM or USIM mobile telephone cards, for instance. A card 10 is somehow a dual-purpose form factor: the first one to read and write multimedia elements into or from a mass memory 12, and the second one to exchange with a functional equivalent to a chip cards, using the means 13.

The invention provides to use a client 320 intended to be loaded upon configuring a mobile device 30. According to a preferred embodiment, said client 320 is deployed by a content provided into the mass memory 12 of a McEX-enabled SD card. The client 320 is thus previously loaded into the memory 12 of a card 10. Upon inserting a card 10 according to the invention into a mobile device 30, the latter automatically unloads said client from the memory 12 to a memory of the device so that the client can be recognized and operated by the operation system 300. Such operation is required upon configuring and can be ignored upon subsequent insertions of the card 10. The loading can be automatically controlled by the operation system 300 of the device or as an alternative solution, a user of said device can manually control said loading using an adapted man-machine interface. The loaded client 320 acts as a "supplicant" such as shown, while referring to FIG. 1, according to an EAP authentication protocol. The client 320's part consists in relaying 350 the authentication requests 33 from or to an authentication server such as the server 3 coupled with the base 4 disclosed in FIG. 1. Such requests are received or routed by the means 340 from an access point 2 acting as the "authenticator" such as disclosed in FIG. 1. Upon receiving a request from an authenticating server, the means 340 transmit the request to the client 320 which translates said request into commands which can be understood by the means 13 of the card 10. Such commands are transmitted to said card by the means 301 and 330 of the device 30. The client 320 is somehow the equivalent of a "proxy" of a secure server, with the latter taking the form of the means 13 of a card according to the invention. Said means 13 perform the processing operations required for completing the request for authentication and the result is routed from the means 13 through the means 11, 330, 301, 320 and 340 to the access point 2, which route said result to the authentication server 3 and 4. The invention more particularly provides that the means can calculate a temporary valid key during a connexion session. Said key is then routed to the means 340 able to perform, if need be, an efficient deciphering of a multimedia content delivered through a video stream, for instance.

According to one alternative solution, the invention provides that the storage means 12 of a card 10 can further contain a software component 301 corresponding to a driver for the commands required by a mobile device to be able to communicate with a card such as the card 10. Thus, if the latter has no means 301, a manual or automatic step of loading, from the memory 12 to a memory of the device can be executed prior to installing the client 320, to enrich the operation system of a mobile device not adapted to managing SD McEX-enabled cards, such as disclosed in FIG. 2.

The invention thus makes it possible to configure any mobile device not having resisting inner means so that it can implement a high authentication. The mobile device undergoes no hardware matching. The protocol of deployment of secrets and information connected to a subscription is executed through a customization protocol known in the field of chip cards, by initializing means 12 and 13 of a card or of any electronic device equipped therewith.

The assembly composed of the configured mobile device and the card 10 according to the invention is totally able to implement a protocol of high authentication such as the EAP. The invention thus enables a large opportunity of development for trading protected multimedia contents. The latter can be securely reproduced for the user of a mobile device such as a portable video player coupled to a card according to the invention.

The invention has been described in a non limitative way, in connection with the field of SD "McEX-enabled" cards. It may concern any type of card provided with inner means resisting the known attacks to make cryptographic calculations and store secrets. Any type of card provided with said means and able to establish a physical or contactless communication with a mobile device can be used for implementing the invention. In addition, the invention has been described preferably while referring to an EAP authentication protocol. Any other protocol can be used insofar as it can face the utilisation of a request for a high authentication such as disclosed in the EAP. The invention shall not be limited to the examples of cards or protocols used for illustrating the implementation of the invention.

The invention claimed is:

1. A mobile device configured to reproduce, for a user, multimedia content provided by a remote content server, said mobile device including:
   means for receiving and managing a mass memory card including inner means for resisting known attacks on cryptographic calculations;
   means for communicating with an access point to a wireless communication network;
   means for reproducing the multimedia content provided by the remote content server, and
   a client means for relaying authentication requests between the mass memory card received in the mobile device and an authentication server that is accessible via the access point, said client means being external to said mass memory card, wherein
   the inner means for resisting known attacks is configured to store secrets and implement cryptographic calculations required for completing said authentication requests relayed between said mass memory card and said authentication server via said client means, and
   when said authentication requests are complete, based on said cryptographic calculations implemented by said inner means, said mobile device is configured to reproduce the multimedia content provided by the remote content server.

2. A mobile device according to claim 1, wherein the completeness of the authentication requests enables the establishment of a secure communication using the wireless network with the remote content server of the remote multimedia content to be reproduced.

3. The mobile device according to claim 1, wherein the inner means for resisting known attacks is further configured to generate said secrets.

4. A method for configuring a mobile device, the method comprising:
   receiving, by the mobile device, multimedia content provided by a remote content server;
   receiving, by a receiving means, a mass memory card having inner means for resisting known attacks on cryptographic calculations, said inner means being configured to store secrets and implement cryptographic calculations required for completing said authentication requests;
   loading, into a memory of said mobile device that is external to said received mass memory card, a client means for relaying authentication requests between the mass memory card received by the receiving means and an authentication server that is accessible via an access point;
   communicating, by a communication means, with the access point to a wireless communication network;
   completing said authentication requests based on said cryptographic calculations implemented by said inner means of said mass memory card; and
   based on authentication, reproducing, by said mobile device, the multimedia content provided by the remote content server.

5. A method according to claim 4, wherein the loading step is automatically carried out, by the mobile device, upon insertion of the mass memory card, the client means being unloaded from a mass memory of the mass memory card to the memory of the mobile device that is external to said mass memory card.

6. A method according to claim 4, wherein the loading step is carried out by a user of the mobile device after inserting the mass memory card into said mobile device, using a man-machine interface provided by the mobile device, and wherein the client means is thus unloaded from a mass memory of the mass memory card to the memory of the mobile device that is external to said mass memory card.

7. A method according to claim 4, further including a previous step of loading, into the memory of the mobile device, means for communicating with said inner means for resisting to known attacks of said card when said communication means are not present in the mobile device.

8. A method according to claim 7, wherein the previous loading step is automatically carried out by the mobile device upon insertion of the mass memory card or by a user of the mobile device using a man-machine interface of the mobile device, with the communicating means being unloaded from a mass memory of the mass memory card to the memory of the mobile device that is external to said mass memory card.

9. The method according to claim 4, wherein the inner means for resisting known attacks is further configured to generate said secrets.

10. A mass memory card configured to be received and managed by a mobile device that is capable of reproducing, for a user, multimedia content previously provided by a remote content server, said mass memory card comprising:
    inner means for resisting known attacks on cryptographic calculations, said inner means being configured to store secrets, and to implement cryptographic calculations required for completing authentication requests to enable a mobile device, in which the memory card is received, to reproduce the multimedia content provided by the remote content server;
    storage means, and
    controlling means for controlling the access to said storage means and to the resisting inner means, wherein said controlling means is configured (1) to receive authentication requests from a client of the mobile device having been relayed from an authentication server, said client being external to said mass memory card, and (2) to transmit authentication responses to said client of the mobile device for relaying to said authentication server, and wherein the storage means unloads the client into a memory of the mobile device (1) so the client is external to said mass memory card, and (2) so the client relays the authentication requests between the mass memory card and an authentication server that is accessible via an access point.

11. A mass memory card according to claim 10, wherein said card complies with the provisions of the "Mobile Commerce Extension" standard established by the "SD Card Association" organization.

12. The mass memory card according to claim 10, wherein the inner means for resisting known attacks is further configured to generate said secrets.

\* \* \* \* \*